United States Patent
Bahuguna et al.

(10) Patent No.: US 7,916,982 B1
(45) Date of Patent: Mar. 29, 2011

(54) ALL FIBER MAGNETO-OPTIC ON-OFF SWITCH FOR NETWORKING APPLICATIONS

(75) Inventors: Rashmi Bahuguna, Kokomo, IN (US); Mani Mina, Ames, IA (US); Robert J. Weber, Boone, IA (US)

(73) Assignee: Iowa State University Research Foundation, Ames, IA (US)

( * ) Notice: Subject to any disclaimer, the term of this patent is extended or adjusted under 35 U.S.C. 154(b) by 260 days.

(21) Appl. No.: 12/112,266

(22) Filed: Apr. 30, 2008

Related U.S. Application Data

(63) Continuation-in-part of application No. 11/733,855, filed on Apr. 11, 2007, now Pat. No. 7,555,177.

(60) Provisional application No. 60/791,276, filed on Apr. 12, 2006.

(51) Int. Cl.
  *G02B 6/12* (2006.01)
  *G02F 1/095* (2006.01)

(52) U.S. Cl. .................. 385/1; 385/14; 385/16; 385/39

(58) Field of Classification Search ........................ None
  See application file for complete search history.

(56) References Cited

U.S. PATENT DOCUMENTS

| | | | |
|---|---|---|---|
| 4,702,557 A | 10/1987 | Beckmann et al. | |
| 4,787,691 A * | 11/1988 | Lorenzo et al. | 385/3 |
| 4,859,013 A | 8/1989 | Schmitt et al. | |
| 4,978,189 A | 12/1990 | Blonder et al. | |
| 4,997,246 A * | 3/1991 | May et al. | 385/2 |
| 5,056,885 A | 10/1991 | Chinn | |
| 5,400,418 A | 3/1995 | Pearson et al. | |
| 5,905,823 A | 5/1999 | Shintaku et al. | |
| 6,580,863 B2 * | 6/2003 | Yegnanarayanan et al. | 385/132 |
| 2004/0190107 A1 | 9/2004 | Hiironen et al. | |

FOREIGN PATENT DOCUMENTS

JP  7-318876 A  * 12/1995

OTHER PUBLICATIONS

W. N. Ye et al. Stress-induced SOI polarization splitter based on Mach-Zehnder interferometer. 3rd IEEE International Conference on Group IV Photonics, pp. 249-251, published Oct. 2006.*
R. A. Soref et al. Large single-mode rib waveguides in GeSi-Si and Si-on-SiO2. IEEE J. Quantum Electronics, 27:8:1971-1974, Aug. 1991.*

(Continued)

*Primary Examiner* — Mike Stahl
(74) *Attorney, Agent, or Firm* — Reinhart Boerner Van Deuren P.C.

(57) ABSTRACT

An integrated fiber optic switch based on the magneto-optic effect of magnetic materials suitable for optical fiber networks is presented. The switch is based on the Faraday Effect exhibited by magneto-optic materials. The all-fiber magneto-optic switch has a beam splitter at the input that splits an incoming signal into orthogonal polarized paths. Each path has at least one magneto-optic Faraday rotator (MOFR) controlled by a field. When the field is present, the polarization of the optical beam changes, thereby turning the switch on or off. A beam coupler couples the orthogonal polarized paths at the output of the all-fiber magneto-optic switch. The switch is constructed in the Mach-Zehnder configuration, utilizing two 3 dB couplers, isolators and MOFRs fabricated on silicon-on-insulator.

22 Claims, 14 Drawing Sheets

OTHER PUBLICATIONS

S. P. Pogossian et al. The single-mode condition for semiconductor rib waveguides with large cross section. J. Lightwave Technology, 16:10:1851-1853, Oct. 1998.*

H. Yokoi et al. Optical nonreciprocal devices with a silicon guiding layer fabricated by wafer bonding. Applied Optics, 42:33:6605-6612, Nov. 2003.*

Bahuguna et al.; All fiber magneto-optics switch for 1310nm systems; submitted to Optical Fiber Communication Conference and Exposition (OFC) and the National Fiber Optic Engineers Conference, 2006; 3 pages.

Tioh et al.; Magnetically Controlled Switches for Optoelectronics Networking: The Problem, Available Technology, New Implementations; publication; Jun. 2007; 3 pages, pp. 2698-2700; vol. 43, No. 6; IEEE Transactions on Magnetics.

T. Aoyama et al., A New Faraday Rotator Using a Thick Gd:YIG Film Grown by Liquid-Phase Epitaxy and Its Applications to an Optical Isolator and Optical Switch, paper, Mar. 1983, 6 pages, pp. 280-285, Journal of Lightwave Technology, vol. LT-1, No. 1.

Yuri S. Didosyan et al., Magnetooptic Switch Based on Domain Wall Motion in Orthoferrites, paper, Sep. 2002, 3 pages, pp. 3243-3245, IEEE Transactions on Magnetics, vol. 38, No. 5.

Masataka Shirasaki et al., Magnetooptical 2X2 switch for single-mode fibers, paper, Oct. 1, 1984, 6 pages, pp. 3271-3276, Applied Optics, vol. 23, No. 19.

Rashmi Bahuguna et al., Magneto-Optic-Based Fiber Switch for Optical Communications, paper, Oct. 2006, 3 pages, pp. 3099-3101, IEEE Transactions on Magnetics, vol. 42, No. 10.

Rashmi Bahuguna et al., Mach-Zehnder Interferometric Switch Utilizing Faraday Rotation, paper, Jun. 2007, 3 pages, pp. 2680-2682, IEEE Transactions on Magnetics, vol. 43, No. 6.

Rashmi Bahuguna et al., A Novel All Fiber Magneto-optic On-off Switch, paper, 2005, 7 pages, pp. 590702-1-590702-7, Proc. of SPIE vol. 5907, 590702.

Rashmi Bahuguna, Investigation of Magneto-optical Properties for Optical Fiber Based Devices, dissertation, 2007, 82 pages.

* cited by examiner

ALL FIBER MAGNETO-OPTIC ON-OFF SWITCH FOR NETWORKING APPLICATIONS

CROSS-REFERENCE TO RELATED PATENT APPLICATIONS

This patent application is a continuation-in-part of co-pending U.S. patent application Ser. No. 11/733,855 filed Apr. 11, 2007, which claims the benefit of U.S. Provisional Patent Application No. 60/791,276, filed Apr. 12, 2006, the teachings and disclosure of which are incorporated herein in their entireties by reference thereto.

STATEMENT REGARDING FEDERALLY SPONSORED RESEARCH AND DEVELOPMENT

This invention was made in part with Government support under Grant Number NSF CNS-0306007-REU awarded by the National Science Foundation. The Government has certain rights in this invention.

FIELD OF THE INVENTION

This invention pertains to networking, and more particularly to network optic switching devices.

BACKGROUND

The growth of the Internet and multi-media applications for digital components such as cell-phones, personal digital assistants (PDAs), computers, and the like has resulted in an ever increasing demand for bandwidth. Along with the growth, the infrastructure needed to handle the increase in bandwidth to support the growth has also increased. Fiber based networks have been deployed to meet the need for the increasing bandwidth demands. Communication networks that are fiber based networks have the capability of making or breaking signal paths depending on the demands of the nodes in the network. Fast switching is therefore needed in order to fully exploit the available bandwidth of the fiber.

Different switching technologies have been developed with the aim of achieving fast and reliable switching. For example, optical micro-electro-mechanical systems (MEMS) switching based on silicon technology, thermal optical switching, electro-optic switching, and acousto-optic switching are the technologies that have been implemented. Drawbacks exist with each type of switch for e.g. MEMS switches and thermo optic switches have switching times of the order of milliseconds, which is slow for a 10 Gb/s LAN communication network, thermo optic switches have a high insertion loss of about 8 dB. Electro-optic switches are considerably faster with switching times in nanoseconds but suffer from high insertion losses of about 9 dB. Acousto-optic switches have switching times in the order of microseconds and an insertion loss of about 6 dB.

Further development of switching technologies is needed to fully use the bandwidth of high-speed fiber networks and other networks.

BRIEF SUMMARY

An all fiber based magneto-optic on-off switch is provided. The switch is used to connect or disconnect a transmitter from a fiber network as required instead of turning the transmitter on and off electronically. With electronic control, the typical semiconductor lasers can take about 300 µs to turn on hence slowing down the system and losing data.

The all-fiber magneto-optic switch has a polarization beam splitter at the input that splits an incoming signal into orthogonal polarized paths. In each path is at least one magneto-optic Faraday rotator that is controlled by a field. When the field is present, the Faraday rotator changes the state of polarization of the incident optical beam, thereby turning the switch on or off depending on the initial polarization of the beam. A polarization beam coupler couples the orthogonal polarized paths at the output of the all-fiber magneto-optic switch.

The magneto-optic Faraday rotator in both embodiments is a bismuth substituted iron garnet.

In one embodiment, the all-fiber magneto-optic switch is configured as a Mach-Zehnder interferometric switch. Preferably, the magneto-optic switch is an integrated Mach-Zehnder interferometer switch constructed from a hybrid fabrication technique utilizing silicon-on-insulator (SOI) wafers.

BRIEF DESCRIPTION

The accompanying drawings incorporated in and forming a part of the specification illustrate several aspects of the present invention and, together with the description, serve to explain the principles of the invention. In the drawings:

FIG. 13 is an isometric illustration of the integrated switch on silicon-on-insulator (SOI) wafer of FIG. 12a;

DETAILED DESCRIPTION

The invention provides an all fiber based magneto-optic on-off switch. The advantages of a fiber construction are simple and economic design, no need of alignment of the free space components and therefore ease of deployment in a network where needed. The switch is used to connect or disconnect a transmitter from the fiber network as required instead of turning the transmitter on and off electronically. The interaction of light with a magnetic material involves the electronic structure of the material and is affected by the magnetic state of the material. This gives rise to magnetooptical effects such as Faraday, Kerr and Voigt effects.

The Faraday Effect is the rotation of the polarization of light as it travels through a magnetic material in the presence of a magnetic field. Longitudinal Faraday Effect (i.e. the rotation of polarization when the applied field is in the same direction as the path of the light) is quite large for optics grade rare earth doped iron garnets. A linearly polarized light can be considered as a superposition of left and right circularly polarized light (LCP and RCP). Application of an external magnetic field changes the magnetic state of the material and as a result the LCP and the RCP light see a different refractive index for the material. This is also known as magnetic circular dichroism. Thus the angle of polarization of the incoming linearly polarized light is rotated by an angle that can be written as, $$\theta = F \times l \times M \quad (1)$$

where F is a constant, l is the path length of light in the magneto-optic material and M is the magnetization of the material. The Faraday rotation measured over the whole surface of the sample is different from that measured for a microscopic area on the surface due to the averaging effects of the randomly oriented magnetizations of the domains.

Bismuth doped rare earth iron garnets have a large magneto-optic figure of merit (i.e. the ratio of the Faraday rotation and the optical absorption in the optical communications wavelength window). Improved thick film ferrimagnetic bismuth-substituted rare-earth iron garnets, 330 μthick and 1.5 mm square, obtained from Integrated Photonics Inc., are used as the Faraday rotators in one embodiment of the switch. The material had Terbium (Tb) and Gallium (Ga) doping for low temperature dependence and low saturation magnetic field necessary to operate the Faraday rotator in the single domain configuration. Macroscopically, a rotation of 45 degrees is obtained at an applied field equal to the saturation field of 350 Oe.

Figure 1A:
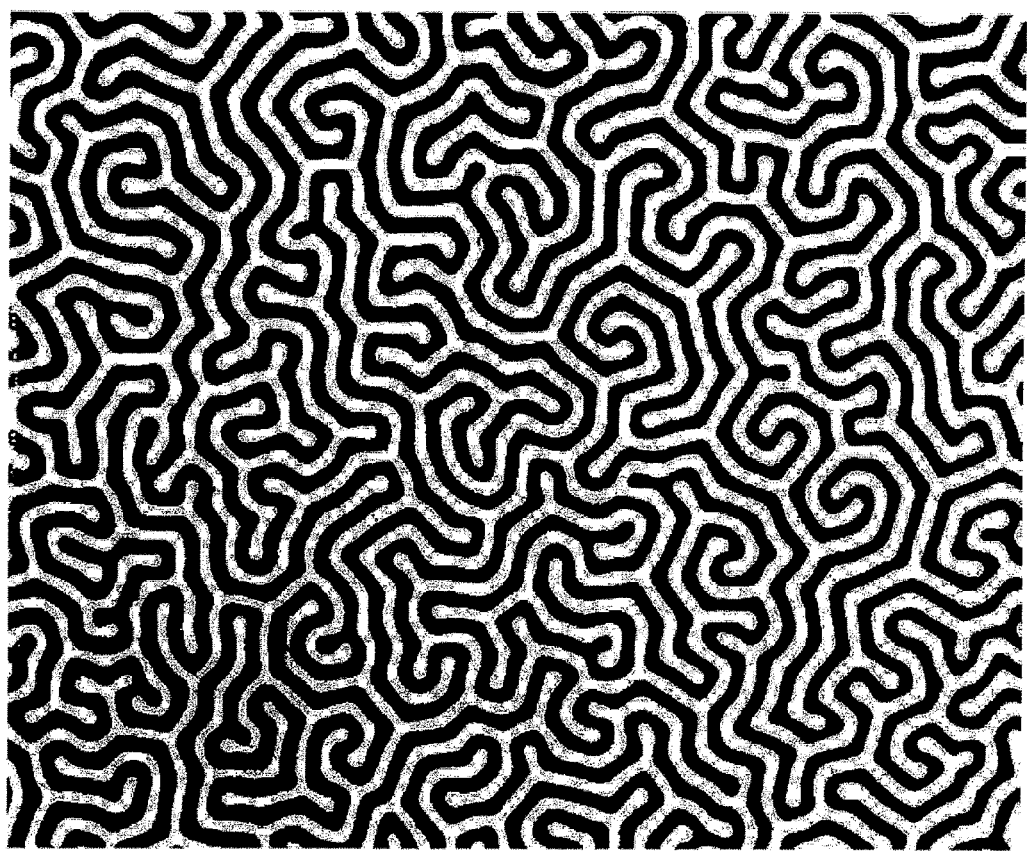
FIG. 1a is an illustration of magnetic domains in a demagnetized standard thick film Faraday rotator with perpendicular anisotropy.
Figure 1B:
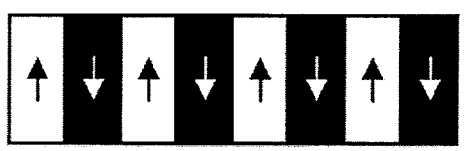
FIG. 1b is a schematic of the lateral view of demagnetized periodic stripe domains.
Figure 1C:
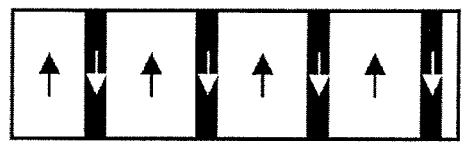
FIG. 1c is a schematic of the lateral view of partially magnetized periodic stripe domains with a field below the saturating field applied to the "up" domains.
Figure 1D:
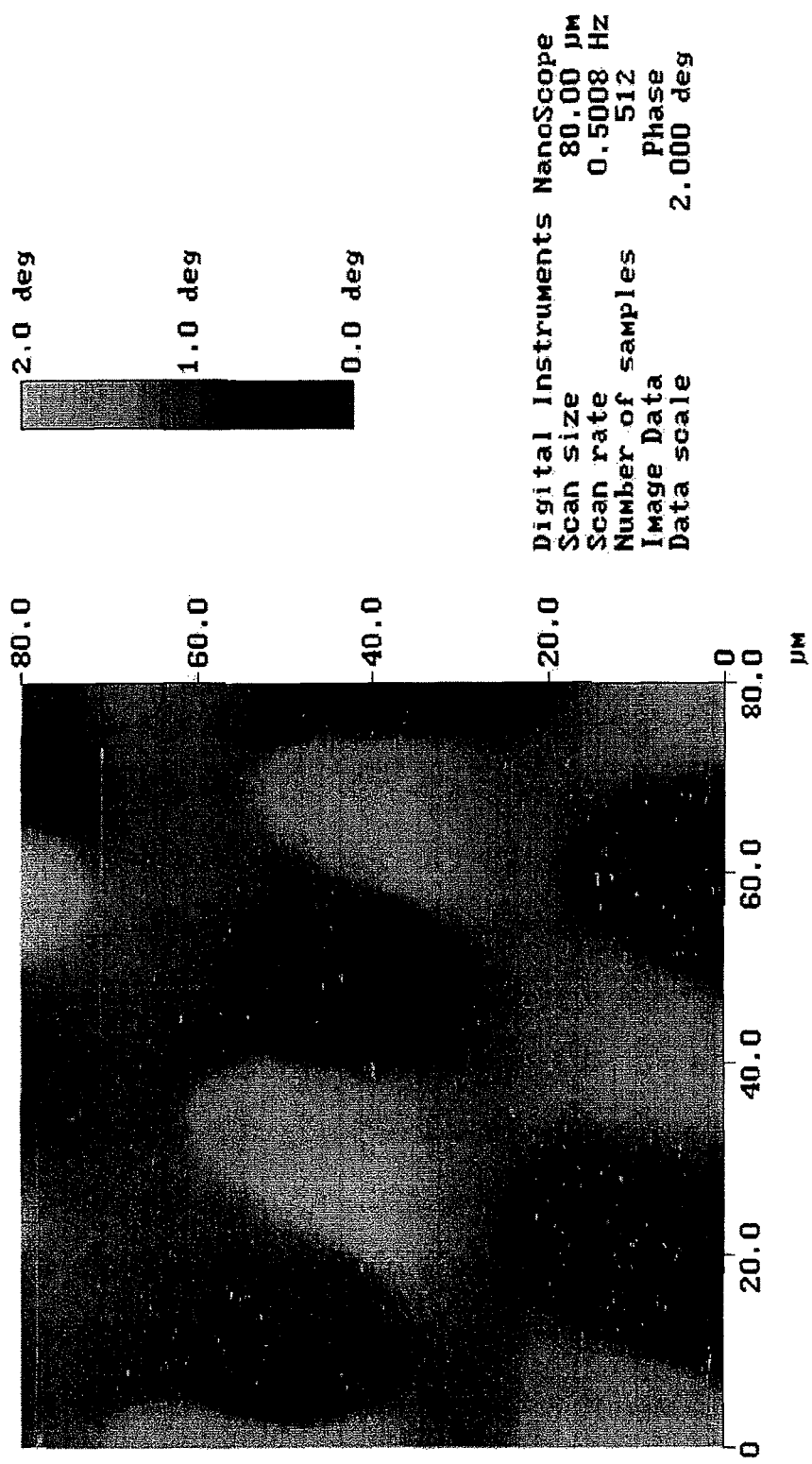
FIG. 1d is a magnetic force microscope view of a demagnetized sample of the actual thick film Faraday rotator that was used in the experimental setup.

A magnetic force microscope was used to image the domain structure of the samples as shown in FIG. 1d. The size of the domains was measured to be about 20 μm. The schematic of the orientation of the domains of a demagnetized sample is shown in FIG. 1b. When an external field in the direction of the "up" domains is applied those domains grow at the expense of the oppositely oriented domains as shown in FIG. 1c. The effect of the growth of the favorably oriented domains is the change in the angle of polarization of the optical signal.

Figure 2:
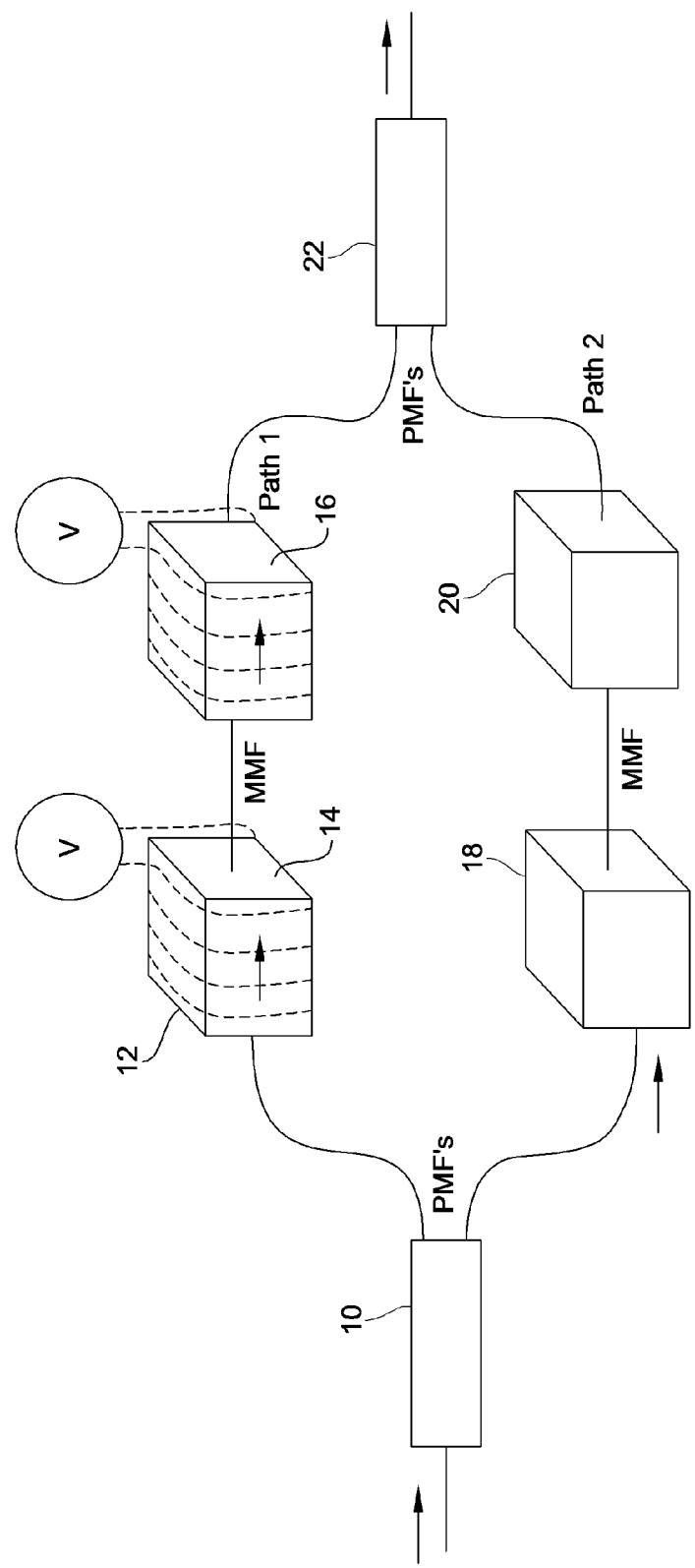
FIG. 2 is a schematic view of a switch setup in accordance with the teachings of the invention.
Figure 3:
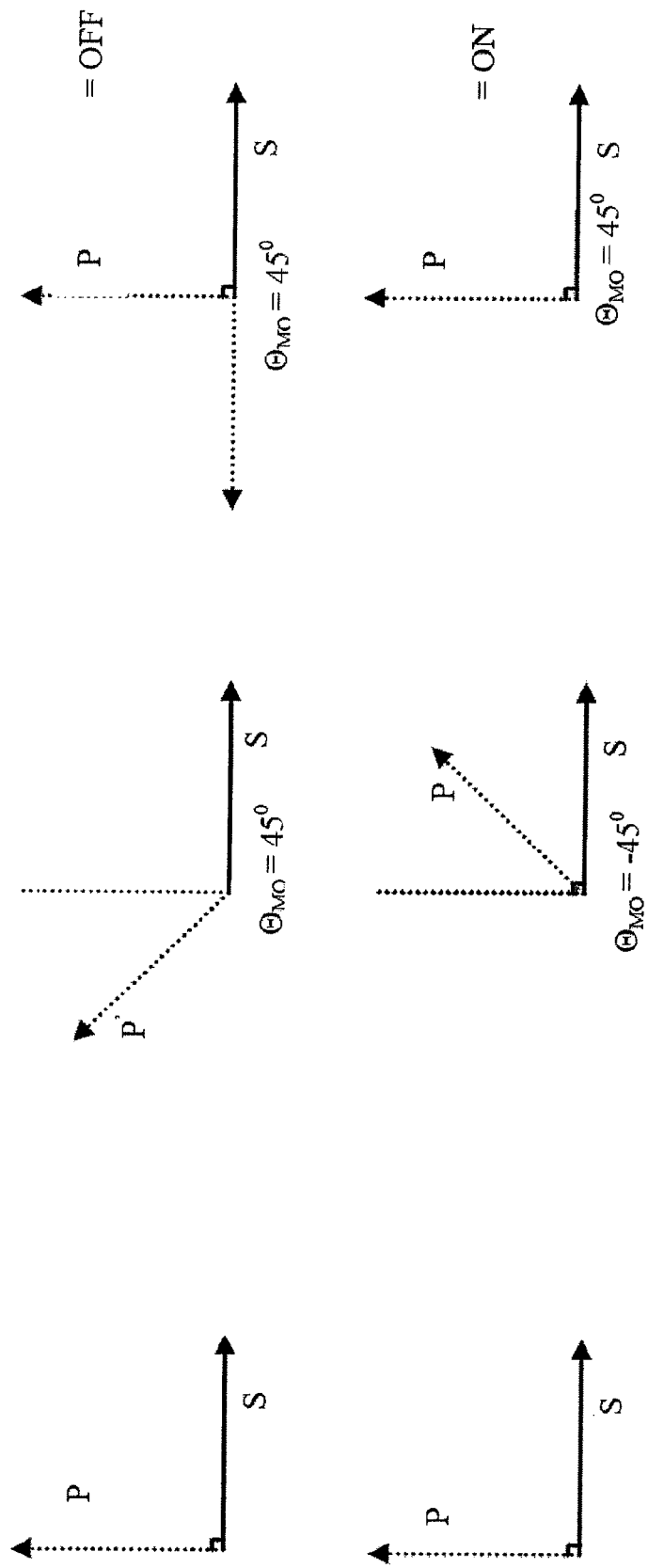
FIG. 3 is a vector representation of the On and Off operation of the switch of FIG. 2.

Turning now to FIGS. 2 and 3, the switch design and principle of operation are shown. The input signal is split into mutually perpendicular P and S polarizations by the polarization beam splitter (PBS) 10, which traverse paths 1 and 2 respectively. A current carrying coil 12, such as, for example, a current carrying solenoid, wound about the magneto-optic samples 14, 16 provides the bias magnetic field. The magnetic field is parallel to the direction of propagation of the light beam. Changing the direction of current in the coil changes the sign of the Faraday rotation. The magneto-optic sample 14 in path 1 rotates the P polarization by forty-five degrees (45°) as shown in FIG. 3. The second magneto-optic sample 16 rotates it further by (45°) making the P polarization rotate a total of ninety degrees (90°). The total field cancels out as shown in FIG. 3(a) and the switch is turned off (i.e. no light is transmitted to the output fiber).

To turn the switch on, the biasing magnetic field across the magneto-optic sample 14 is reversed and the P polarization is therefore rotated by −45° as shown in FIG. 3b. The second magneto-optic sample 16 rotates the polarization by +45° making the total rotation equal to zero. The two orthogonal polarizations are combined by the polarization beam combiner (PBC) 22 and light is transmitted to the output fiber. The powers of the signals in both the paths should be almost the same in order to cancel the fields and obtain a good extinction ratio. This is ensured by making the two paths identical by placing two magneto-optic samples 18, 20 without any applied magnetic field in path 2.

The change in polarization due to the magneto-optic sample can be expressed with the Jones transformation matrix, $$J(l) = e^{-j(\frac{2\pi}{\lambda})ln_{MO}} \begin{pmatrix} \cos(Fl) & -\sin(Fl) \\ \sin(Fl) & \cos(Fl) \end{pmatrix} \quad (2)$$

where l is the thickness of the material, $n_{MO}$ is the refractive index of the magneto-optic material, and F is the Faraday rotation per unit length. Taking into account the reflection losses at the boundaries of two different media, the field before the PBC in path 1 for an off state is $$E_{1,off} = \{\overline{T}_{MO_2} J_2(l) T_{MO_2}\}\{\overline{T}_{MO_1} J_{1,off}(l) T_{MO_1}\}\{\overline{T}_{PBS} S_{PBS} T_{PBS}\} \begin{pmatrix} E_p \\ 0 \end{pmatrix} \quad (3)$$

and for an on state is $$E_{1,on} = \{\overline{T}_{MO_2} J_2(l) T_{MO_2}\}\{\overline{T}_{MO_1} J_{1,on}(l) T_{MO_1}\}\{\overline{T}_{PBS} S_{PBS} T_{PBS}\} \begin{pmatrix} E_p \\ 0 \end{pmatrix} \quad (4)$$

The field in path 2 is $$E_2 = \{\overline{T}_{MO_2} J_2(l) T_{MO_2}\}\{\overline{T}_{MO_1} J_{1,on}(l) T_{MO_1}\}\{\overline{T}_{PBS} S_{PBS} T_{PBS}\} \begin{pmatrix} 0 \\ E_s \end{pmatrix} \quad (5)$$

where $T_{PBS}$ and $\bar{T}_{PBS}$ are the transmission matrices at the interface of the SMF (single mode fiber at the input) and the PBS and the PBS and the outgoing PMF (polarization maintaining fiber), given by the following equations, $$T_{PBS} = \begin{pmatrix} \frac{2n_{PBS}}{n_{SMF}+n_{PBS}} & 0 \\ 0 & \frac{2n_{PBS}}{n_{SMF}+n_{PBS}} \end{pmatrix}, \quad (6)$$

$$\bar{T}_{PBS} = \begin{pmatrix} \frac{2n_{PMF}}{n_{PMF}+n_{PBS}} & 0 \\ 0 & \frac{2n_{PMF}}{n_{PMF}+n_{PBS}} \end{pmatrix}$$

and $S_{PBS}$ is the splitting ratio matrix for the PBS, it is assumed to be 1:1 for analysis hence $$S_{PBS} = \begin{pmatrix} 1/\sqrt{2} & 0 \\ 0 & 1/\sqrt{2} \end{pmatrix} \quad (7)$$

The Jones matrices for the polarization rotation of ±45 degrees by the first magneto-optic material in the off and on state is given as, $$J_{1,\textit{off}} = J_2(l) = e^{-j\left(\frac{2\pi}{\lambda}\right)ln_{MO}} \begin{pmatrix} \frac{1}{\sqrt{2}} & -\frac{1}{\sqrt{2}} \\ \frac{1}{\sqrt{2}} & \frac{1}{\sqrt{2}} \end{pmatrix}, \quad (8)$$

$$J_{1on} = e^{-j\frac{2\pi}{\lambda}ln_{MO}} \begin{pmatrix} \frac{1}{\sqrt{2}} & \frac{1}{\sqrt{2}} \\ -\frac{1}{\sqrt{2}} & \frac{1}{2} \end{pmatrix}$$

where the subscript denotes the first or second magneto-optic material. The transmission matrices at the interface of the PMF and the second magneto-optic sample and the second sample and the PMF are:

$$\bar{T}_{MO_2} = \bar{T}_{MO_1} = \begin{pmatrix} \frac{2n_{PMF}}{n_{PMF}+n_{MO}} & 0 \\ 0 & \frac{2n_{PMF}}{n_{PMF}+n_{MO}} \end{pmatrix}, \quad (9)$$

$$T_{MO_2} = T_{MO_1} = \begin{pmatrix} \frac{2n_{MO}}{n_{PMF}+n_{MO}} & 0 \\ 0 & \frac{2n_{MO}}{n_{PMF}+n_{MO}} \end{pmatrix}$$

Analysis of the switch shows that a 180° difference between the polarizations in the two paths is needed for the switch to operate in the off state. This confirms the intuitive explanation in FIG. 3.

Figure 4A:
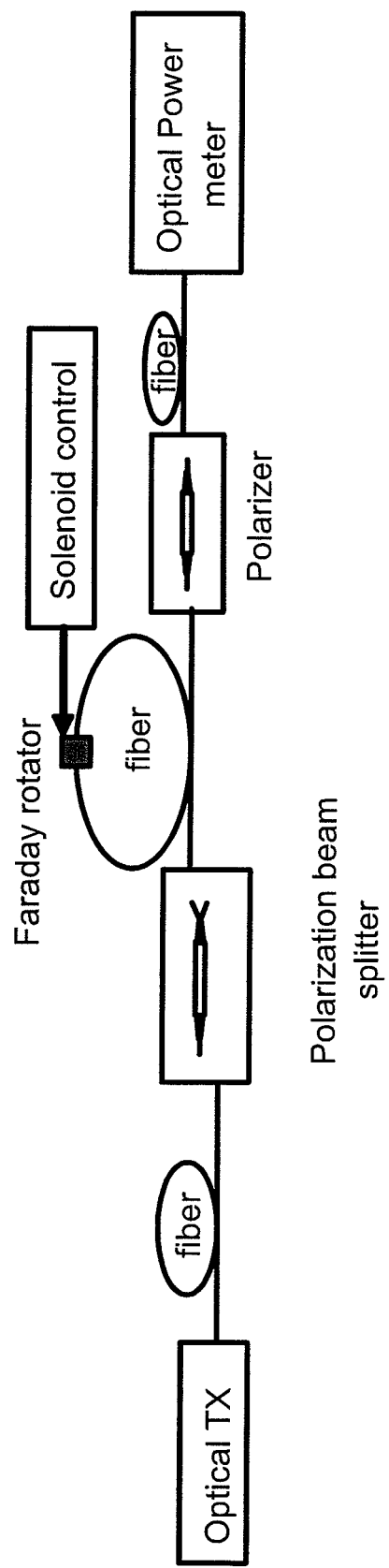
FIG. 4a is a schematic view of the setup to measure Faraday rotation of the Faraday rotator.
Figure 4B:
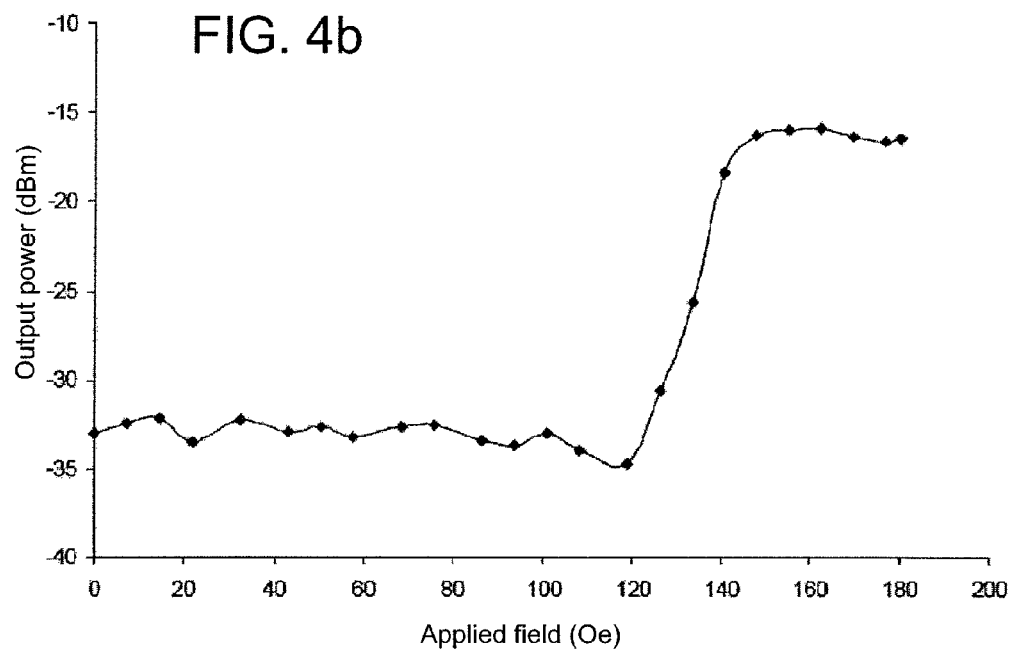
FIG. 4b is a graph of output power versus applied magnetic field undergone by an input beam to the Faraday rotator of FIG. 4.
Figure 4C:
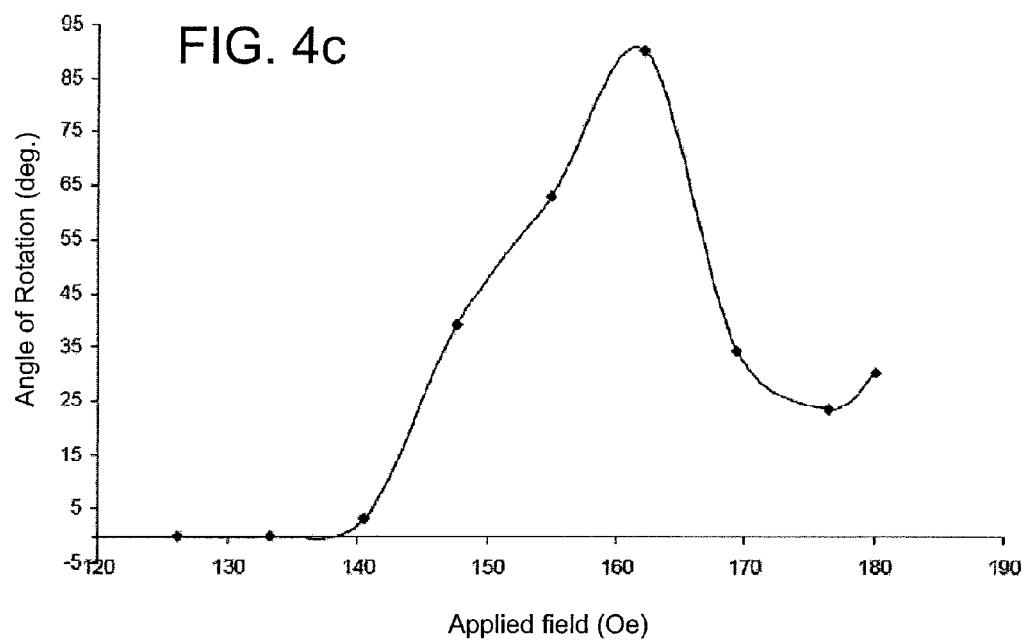
FIG. 4c is a graph of the angle of rotation versus applied magnetic field undergone by an input beam to the Faraday rotator of FIG. 4.

Now that the overall design has been described, the Faraday rotation of a single Faraday rotator was measured as shown in FIG. 4a. Light from an optical transmitter was split into the two orthogonal polarizations by the PBS 10. One of the two outputs was utilized for the measurement of the Faraday rotation. Magneto-optic material placed in the path of the polarized light rotates the plane of polarization of the beam which is intensity modulated with the help of a polarizer according to the following equation, $$P_o = P_{in} \cos^2 \alpha \quad (10)$$

where α is the angle of polarization of the incoming light with respect to the optical axis of the polarizer. The applied magnetic field was kept less than the saturation magnetic field of 350 Oe. FIGS. 4(b) and 4(c) show the output power and the Faraday rotation undergone by the input beam with varying applied magnetic field.

Turning now to FIGS. 4b and 4c, a Faraday rotation of 90 degrees was observed at a field of about 160 Oe with a drop off in the rotation as the field was further increased. This is due to the fact that a local domain orientation was examined since the beam size was about 62.5 μm (comparable to the core diameter of a multimode fiber). A domain that is anti parallel to the applied field gives an initial rotation of about 45 degrees and will further rotate by 45 degrees when fully saturated giving a total of 90 degree rotation from the initial state. The drop off in the rotation can be explained by the cosine term of Equation 10. Therefore the experimental switch was implemented with only one magneto-optic material instead of two in both paths as shown in FIG. 2. According to the value of the field, i.e. 160 Oe or zero, applied to the sample in path 1, the switch turned off or on respectively. The second magneto-optic material may provide additional tuning capability to the angle of rotation; however, the insertion loss will increase.

Figure 5:
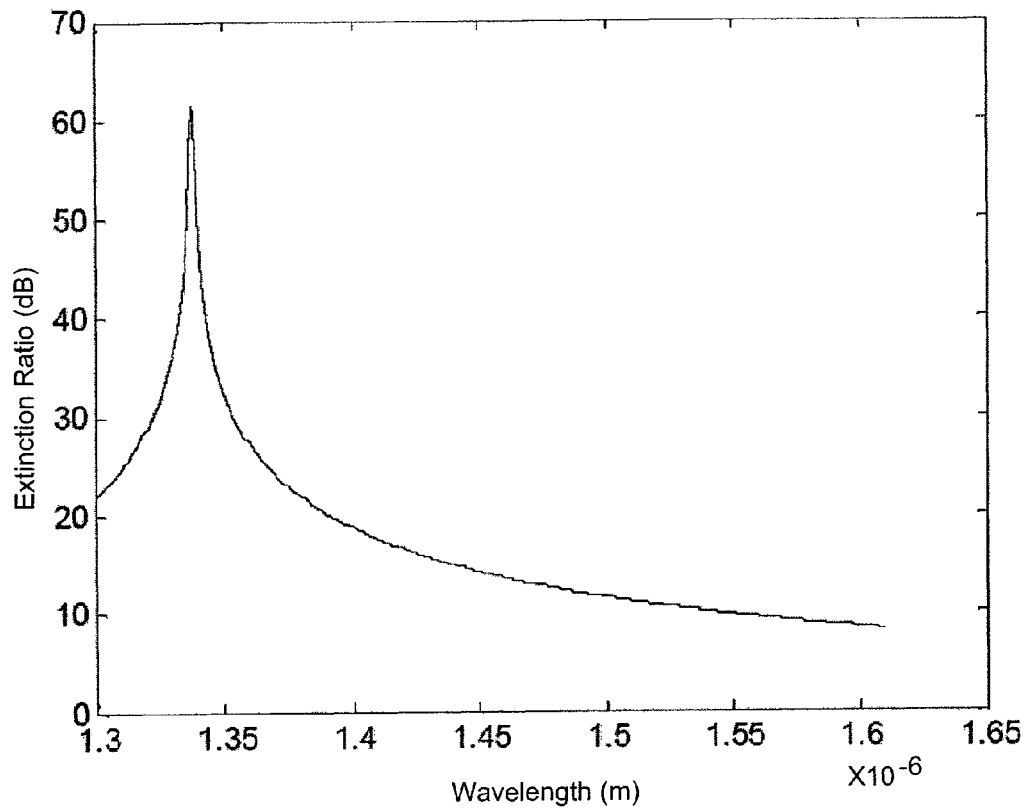
FIG. 5 is a graph of the calculated extinction ratio versus wavelength of the Faraday rotator of FIG. 2.

Turning now to FIG. 5, the extinction ratio is calculated from the above equations. The extinction ratio measured at 1310 nm is about 19 dB. It can be seen that the extinction ratio is a function of the wavelength due to the dispersion of the material.

The switching time of the device is dependent on the magnetization reversal process for the magnetic material Due to finite velocity of domain walls, domain wall motion occurs on a much larger time scale as compared to individual magnetic moment rotation. Consequently, the switching time obtained is much larger. Also the displacement of domain walls is not reversible due to surface defects, impurities, lattice defects, and other phenomena which minimize the associated magneto static energy, thus pinning them to the defect sites. This leads to a fluctuating output power level for different switching cycles. If the domain walls are tightly pinned in their respective positions, the problems can be solved. Cutting grooves in planes parallel to the domain walls is an example of pinning domain walls at surface defects. Introducing surface defects could pin the domain walls at all times.

In this experiment, the stripe domains were involved in the switching. The external magnetic field was applied with the help of a solenoid coil with 1.1 mH inductance and resistance of about 2Ω. With the L/R time constant of 0.55 ms, it takes about three time constants (i.e. 1.65 ms) for the current to reach its maximum value. The switching time of the modulator is thus determined by the inductance of the solenoid coil. The switching time can, however, be improved using a solenoid driver circuit that can rapidly change the current and the flux in the coil and drive a controllable amount of current in the windings and enable as fast as possible current rise and fall times for good high speed performance. A current of 5 amps is required through the solenoid coil for a magnetic field sufficient to turn the switch on. Fast current build-up can be facilitated by using a supply voltage which is several times higher than the nominal voltage applied across the solenoid.

A MC33886IC. from Motorola was used for the experiment. It is a monolithic H-Bridge ideal for bi-directional thrust solenoid control. Internal control logic, charge pump, gate drive and low RDS (ON) MOSFET output circuitry is integrated in the chip. The MC33886 is able to control continuous inductive DC load currents up to 5.0 A with the capability of pulse width modulation of output loads up to 10 kHz. Two independent inputs control the two outputs.

Figure 6:
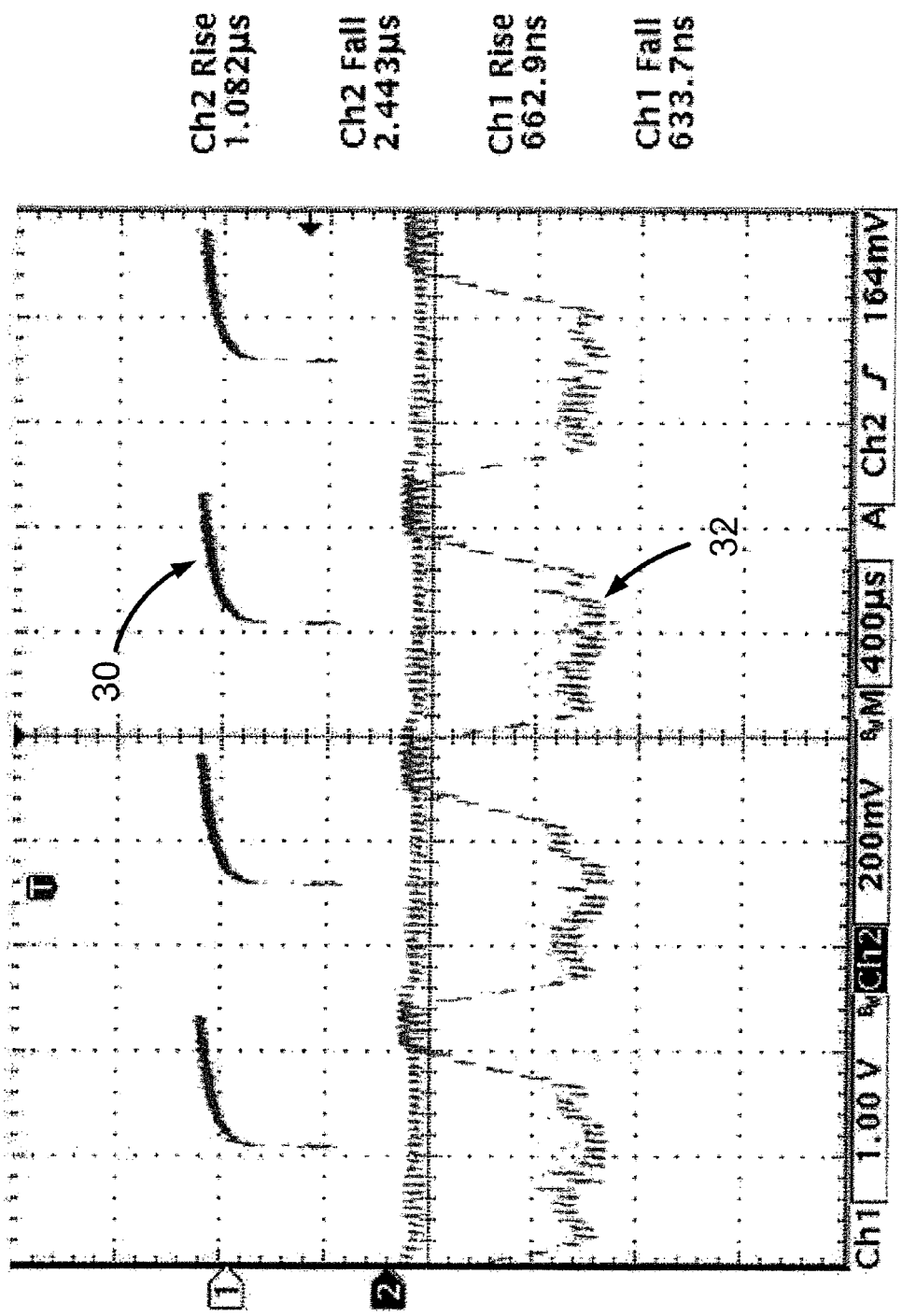
FIG. 6 is a graph of the switching time of the Faraday rotator going from a light transmission state to a light blocking state.

Turning now to FIG. 6, the rise and fall times of about 2 μs shown indicates how fast the switch goes from a light transmission to a light blocking state. In FIG. 6, the measured external applied voltage is labeled with reference number 30 and the switching of the optical signal is labeled with reference number 32. The dynamics of switching are related to the dynamics of the domain wall motion in the magneto-optic material. A magneto-optic material with a higher velocity of domain walls such as yttrium orthoferrite will likely result in a better switching time.

One type of magneto-optic switch that can be implemented as an all fiber switch is a Mach-Zehnder type optical switch utilizing Faraday rotation. In the description that follows, the switch will be implemented with Faraday rotation exhibited by bismuth substituted iron garnet ($(Bi_{1.1}Tb_{1.9})(Fe_{4.25}Ga_{0.75})O_{12}$) samples, 500 um thick. The switch is an all-fiber device where light does not exit from the fiber except when propagating through the magneto-optic Faraday rotator (MOFR). Simple construction and operation of Mach-Zehnder interferometer (MZI) based optical devices make them suitable for photonic integrated circuits (PICs). Thus the interferometric configuration paves the way for fabrication of integrated magneto-optical devices that are low cost, better performing and compatible with all-fiber optical communications networks as will be discussed more fully below.

Figure 7:
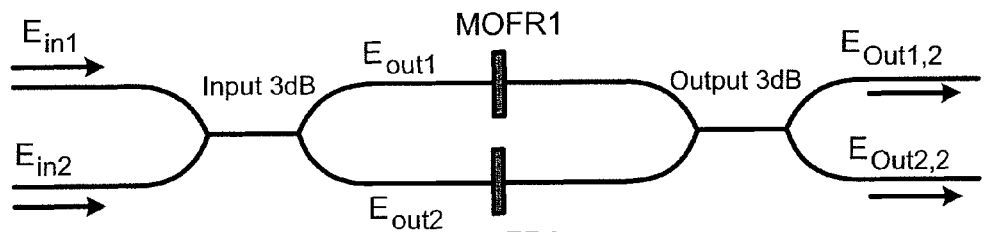
FIG. 7 is a schematic of a Mach-Zehnder interferometric switch utilizing Faraday rotation.

The switch construction is similar to the MZI shown in FIG. 7. The input 3 dB coupler splits the incoming signal equally at the output ports. MOFR samples are placed in each path and the path length difference of the interferometer arms is zero. The signals are then combined by an output 3 dB coupler at the output. The phase shift required for the interferometric operation is obtained by rotation of polarization of the optical signal incident on the MOFR samples. Using simple matrix analysis the switching operation can be modeled as follows. The signal at the output ports of a 3 dB coupler is given as, $$\begin{pmatrix} \vec{E}_{out1} \\ \vec{E}_{out2} \end{pmatrix} = \frac{1}{\sqrt{2}} \begin{pmatrix} 1 & j \\ j & 1 \end{pmatrix} \begin{pmatrix} \vec{E}_{in1} \\ \vec{E}_{in2} \end{pmatrix} \quad (11)$$

where $\vec{E}_{in1}$ and $\vec{E}_{in2}$ are the input signals at the respective input ports of the coupler and $\vec{E}_{out1}$ and $\vec{E}_{out2}$ are the output signals at the respective output ports of the coupler.

The components of a signal transmitted through a MOFR can be written with the help of Jones matrices as, $$\begin{pmatrix} E_x \\ E_y \end{pmatrix} = \begin{pmatrix} \cos\kappa & -\sin\kappa \\ \sin\kappa & \cos\kappa \end{pmatrix} \quad (12)$$

where κ is the angle of rotation of the state of polarization (SOP) of the input signal. Let us consider a linearly polarized signal that can generally be written as follows, $$\vec{E}_{in} = \vec{E}_{in1} = \hat{x}E_{ox}\cos\phi + \hat{y}E_{oy}\cos\phi \quad (13)$$

where φ is the phase angle. For simplicity and without loss of generality, $\phi=0$ and $E_{oy}=0$ can be assumed, with the second input $E_{in2}=0$. The output of the output 3 dB coupler is obtained by matrix multiplication of the individual components of the interferometric setup and is given by, $$\begin{pmatrix} \vec{E}_{out1,2} \\ \vec{E}_{out2,2} \end{pmatrix} = \begin{pmatrix} \frac{e^{-j\beta}}{2}E_{ox}[\hat{x}(\cos\theta - \cos\alpha) + \hat{y}(\sin\theta - \sin\alpha)] \\ j\frac{e^{-j\beta}}{2}E_{ox}[\hat{x}(\cos\theta - \cos\alpha) + \hat{y}(\sin\theta - \sin\alpha)] \end{pmatrix} \quad (14)$$

where θ and α are the Faraday rotation angles of MOFR1 and MOFR2 respectively. The values of the output fields are given in table 1 from which one can see the transfer of the optical signal from one output port to another depending on the values of the angles. $P_{out1,2}$ and $P_{out2,2}$ denote the corresponding optical powers.

TABLE I

| | Interferometric output | |
|---|---|---|
| | $\theta = \alpha = 0$ | $\theta = \alpha = -90°$ |
| $\vec{E}_{out1,2}$ | 0 | $e^{-j\gamma}E_{ox}\hat{y}$ |
| $\vec{E}_{out2,2}$ | $je^{-j\gamma}E_{ox}\hat{x}$, ON | 0, OFF |
| $P_{out1,2}$ | 0 | $E_{ox}^2$ |
| $P_{out2,2}$ | $E_{ox}^2$ | 0 |

For a 1×1 switch, port 2 can be chosen as the output port as the SOP of the original input signal remains the same. There is however a 90° phase shift as expected.

Figure 8:
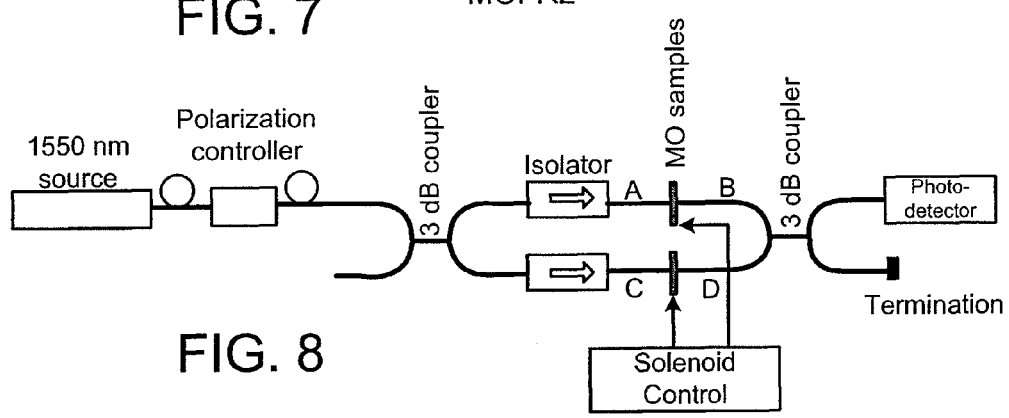
FIG. 8 is a schematic of a setup of an all fiber Mach-Zehnder interferometric switch based on Faraday rotation.
Figure 9:
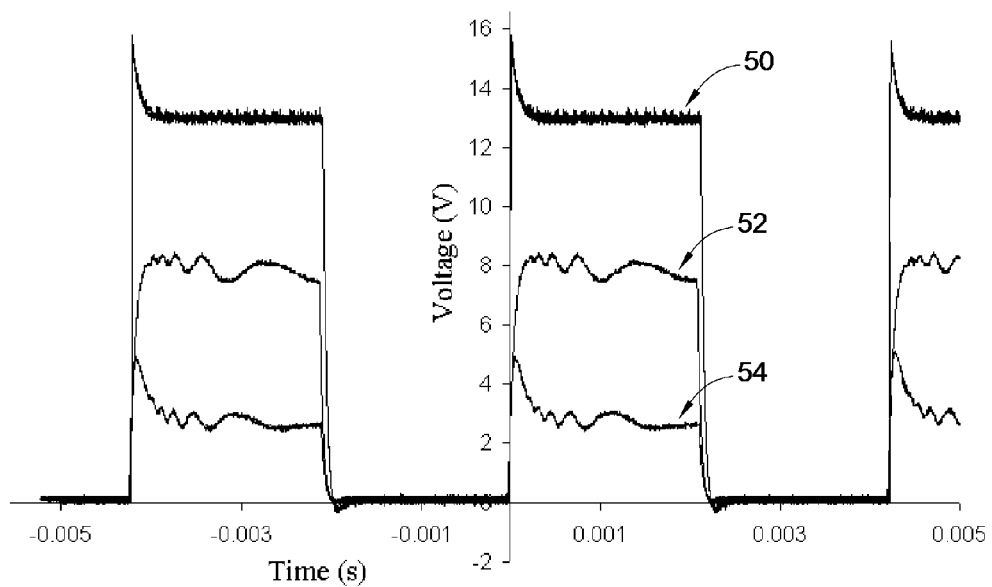
FIG. 9 is a graph of an input signal overlaid on an output signal at 0 Oe and 200 Oe for the switch of FIG. 8 using single mode fibers.
Figure 10:
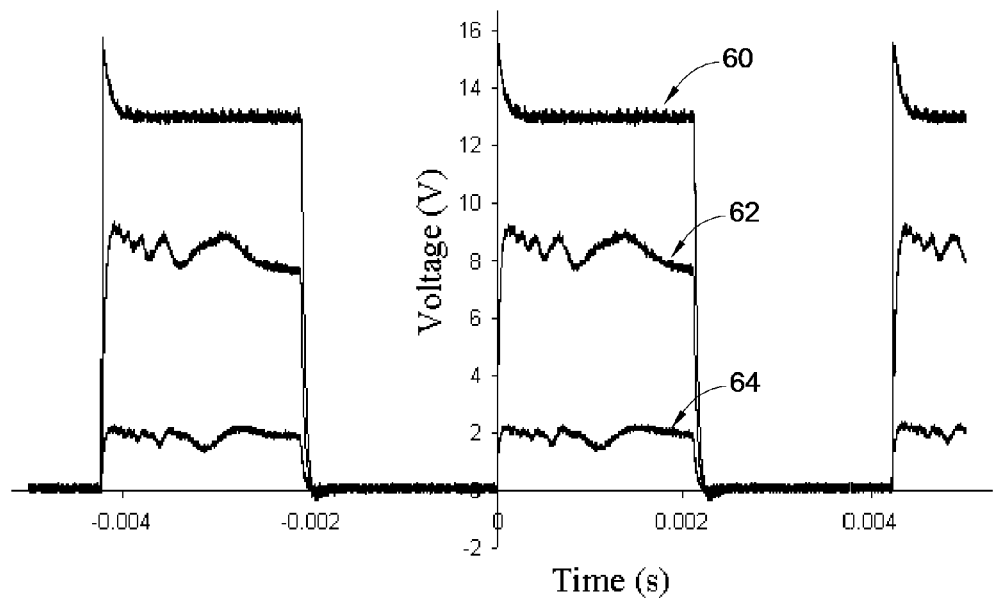
FIG. 10 is a graph of an input signal overlaid on an output signal at 0 Oe and 200 Oe for the switch of FIG. 8 using multimode fibers.

Now that the all-fiber Mach-Zehnder interferometric switch has been described, experimental test results shall now be described. The experimental setup of the switch is shown in FIG. 8. In FIG. 8, the input from a 1550 nm laser is linearly polarized with the help of a polarization controller (PC). The MOFRs are actuated with the help of current carrying solenoids that provide the bias magnetic field. The input laser was modulated at 235 Hz. Other modulation frequencies can be used. The optical length of the two paths was made equal by employing the same length of fiber and the same thickness of MOFRs in both the paths. Isolators were used to reduce back reflections in the setup. For proof of principle, an external magnetic field was applied across MOFR1 and the field across MOFR2 remained zero. The output optical power was detected with the help of a photodetector. The generated photocurrent was converted to voltage across a load resistor. This voltage was monitored by an oscilloscope. The experiment was carried out for both single mode (SMF) and multi-mode (MMF) fibers. In the case of MMFs only fibers A, B, C and D (see FIG. 8) were MMFs. The measured optical intensity is shown in FIGS. 9 (SMF fibers) and 10 (MMF fibers) respectively. In FIG. 9, signal 50 is the input signal, signal 52 is the output signal with the switch on at 0 Oe, and signal 54 is the output signal with the switch off at 200 Oe. In FIG. 10, signal 60 is the input signal, signal 62 is the output signal with the switch on at 0 Oe, and signal 64 is the output signal with the switch off at 200 Oe.

Typically Faraday rotation for ferromagnetic materials can be treated as linear with applied field $H_{app}$ up to its saturation field $H_{sat}$. In the linear region the Faraday rotation is $\theta=\theta$ sat$(H_{app}/H_{sat})$ where $H_{sat}$ is the rotation at saturation. This relationship is true when the diameter of the optical beam incident on the surface of the material is large enough to sample a large number of domains in order to average out the effects of the contributions by individual domains. For smaller beam sizes this relationship does not hold and individual contributions play an important role in the determination of the Faraday rotation. The domain size of the ferromagnetic samples used was measured to be about 20 µm. Thus a MMF with a beam size of about 62.5 µm will see a larger number of domains compared to that seen by a SMF that has a beam diameter of about 10 µm. This results in a different value for Faraday rotation for a MMF as compared to that obtained for a SMF. For the same value of the external applied field the output was attenuated more for MMFs.

The interferometric output was measured by varying the external magnetic field across MOFR1 from zero to 200 Oe. The output signal was clearly attenuated with the application of the magnetic field. The measured extinction ratio for the ON/OFF operation of the switch was about 8.5 dB for SMFs and about 12.5 dB for MMFs. For a better extinction ratio, a reverse magnetic field across MOFR2 can be applied and the bias field across both rotators can be simultaneously controlled as predicted by the theoretical analysis.

Figure 11:
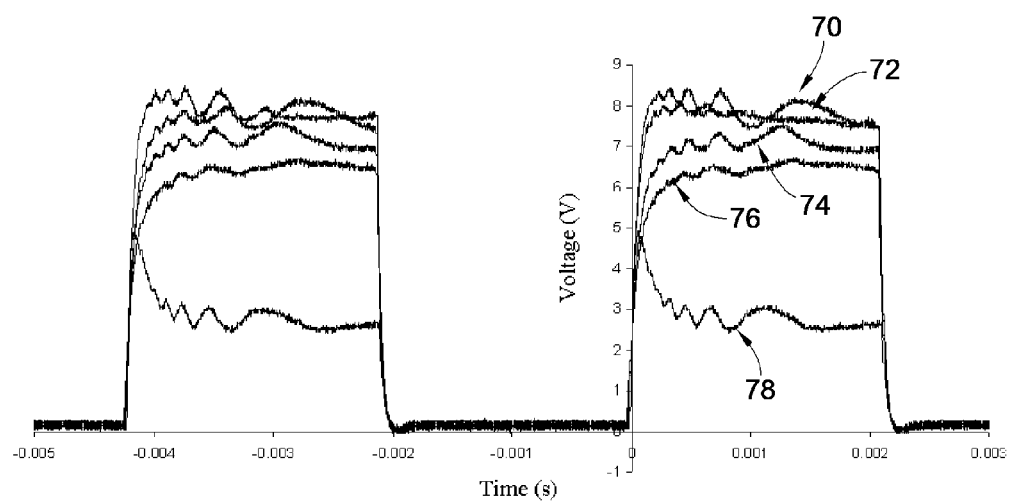
FIG. 11 is a graph of the measured output field of the switch of FIG. 9 with varying magnetic field ranging from 0 Oe to 2000e.

It is well known that Faraday rotation depends on the value of the external bias magnetic field below $H_{sat}$. The magnetic field was varied and the output signal was measured as shown in FIG. 11, for SMFs. Signal 70 is the measured output field at 0 Oe, signal 72 is the measured output field at 50 Oe, signal 74 is the measured output field at 100 Oe, signal 76 is the measured output field at 150 Oe, and signal 78 is the measured output field at 200 Oe.

The signal was attenuated more with increasing magnetic field and would saturate for a field value close to the saturation field of 350 Oe. Thus the experiments show that switching is achieved well below the saturation field and therefore hysteresis can be effectively avoided.

The insertion loss of the device was measured to be about 4.2 dB and includes Fresnel reflection loss from the fiber/MO interface as well as the loss due to individual components and fiber connectors.

The switching time of the device depends on the switching of the magnetic domains in the magnetic material. The two main mechanisms for switching are rotation of individual magnetic moments and motion of domain walls. Due to the finite velocity of domain walls, domain wall motion occurs on a much larger time scale as compared to individual magnetic moment rotation. Consequently the switching time obtained is much larger. For faster switching the domain wall motion may be restricted by pinning the walls to artificially introduced defects such as grooves in planes parallel to the domain walls. In this case the switching time obtained can be in the order of nanoseconds. This however worsens the optical loss due to the poor surface quality of the MOFR.

The switching time for the unpinned domains walls was measured to be about 2 µs. The measured time was limited by the external circuit that provided the bias magnetic field. There is a time constant associated with the inductance of the current coil which is generally greater than the switching time limit determined by the domain dynamics. For a rapid di/dt, a large voltage capacity is needed in the solenoid drive circuit. This was achieved by connecting four individual H-bridge ICs capable of controlling DC currents up to 5 A with pulse width modulation up to 10 kHz. The external field across the MOFRs can be treated as homogeneous as the dimensions of the solenoid (diameter=2 cm, length=6.5 cm) were much greater than those of the MOFRs.

From the foregoing, it can be seen that an all-fiber magneto-optic switch based on the magneto-optic effect of magnetic materials has been designed and demonstrated with promising performance and compatibility with fiber networks. The effect of beam size on Faraday rotation has also been demonstrated. The switching time of the device can be much less, on the order of a few nanoseconds, which is desirable for bit level switching in fiber communications networks.

It is desirable to have an efficient, practical, and deployable design with low insertion loss and a highly effective rotation and at the same time ensuring that the interferometer produces precise phase control. Having fibers, connecters and their supporting structures create many small parametric variables that are hard to overcome. A better solution is an integration of the design on a Si chip where we use the integration process to define the path in a more exact way. An integrated solution shows the full capability, is efficient, deployable, and is capable of mass production for the magneto-optic interferometer.

Specifically, the existence of the vast microelectronics infrastructure has fueled research and development of photonic integrated circuits on silicon based substrates, especially silicon-on-insulator (SOI). Both the optical waveguides and electronic control circuitry can be integrated on the same chip resulting in efficient devices with low production costs. Silicon has been the center of attention and attempts have been made to derive various functionalities from the material by tailoring its properties. For instance doping Si with Erbium to make it optically active and therefore create silicon based light emitters and lasers and similarly doping Si with Ge for constructing silicon-based photodetectors operating at optical communications wavelengths of 1310 nm and 1550 nm.

The two types of integration methods are monolithic where all the components are made on the same substrate and hybrid where some of the components are processed separately and then assembled. For magneto-optical devices it is difficult to fabricate the material monolithically on semiconductor substrates using standard processing methods. The process conditions required to obtain high-quality ferrites include both temperatures over 700° C. and oxidizing atmospheres. A substantial difference in the coefficient of thermal expansion exists between most ferrites and semiconductors, leading to large stress at the ferrite/semiconductor interface as the wafer is cooled to ambient temperature from the high growth and processing temperatures. Wafer bonding is another technique that has been used to bond garnet films on SOI substrates. It uses the attractive forces between materials to adhere together and thus two wafers can be connected without any adhesive.

In view of these techniques and limitations associated therewith, an embodiment of a method of the present invention produces an integrated design for the MZI utilizing Faraday rotation. Specifically, an embodiment of the method of the present invention utilizes a hybrid fabrication technique. This provides a method wherein the bulk FR samples can be inserted in the path of the optical waveguides. In one embodiment the SOI wafers are obtained commercially from Ice-MOS Technology. The main steps of fabrication of the SOI wafer include grinding flat and surface polishing the handle Si wafer to remove all damage. It is then cleaned and oxidized using wet or dry oxidation. The device layer, which is the top Si layer, is then bonded to the handle wafer. High temperature annealing is done to form a stable bond wafer. Finally, the device layer is then ground and polished to specifications.

In one embodiment, the waveguides may be fabricated on silicon-on-insulator (SOI) wafers that have the following dimensions: Handle thickness 475 µm, oxide thickness of 5000 Å and device thickness of about 10 µm. These dimensions were chosen in order to be compatible with single mode fibers with core diameter of 10 µm which would be end coupled to Si waveguides in the present embodiment. Efficient coupling of fibers to waveguides have been investigated and various techniques may be utilized in embodiments of the present invention, such as tapered coupling sections, that may be also be irregular. These sections adiabatically change the spot size from the input waveguide to the output waveguide and therefore have less loss. The focus in the present embodiment, however, is the Mach-Zehnder structure and how to integrate the magneto-optical sample with the MZI device.

Figure 12A:
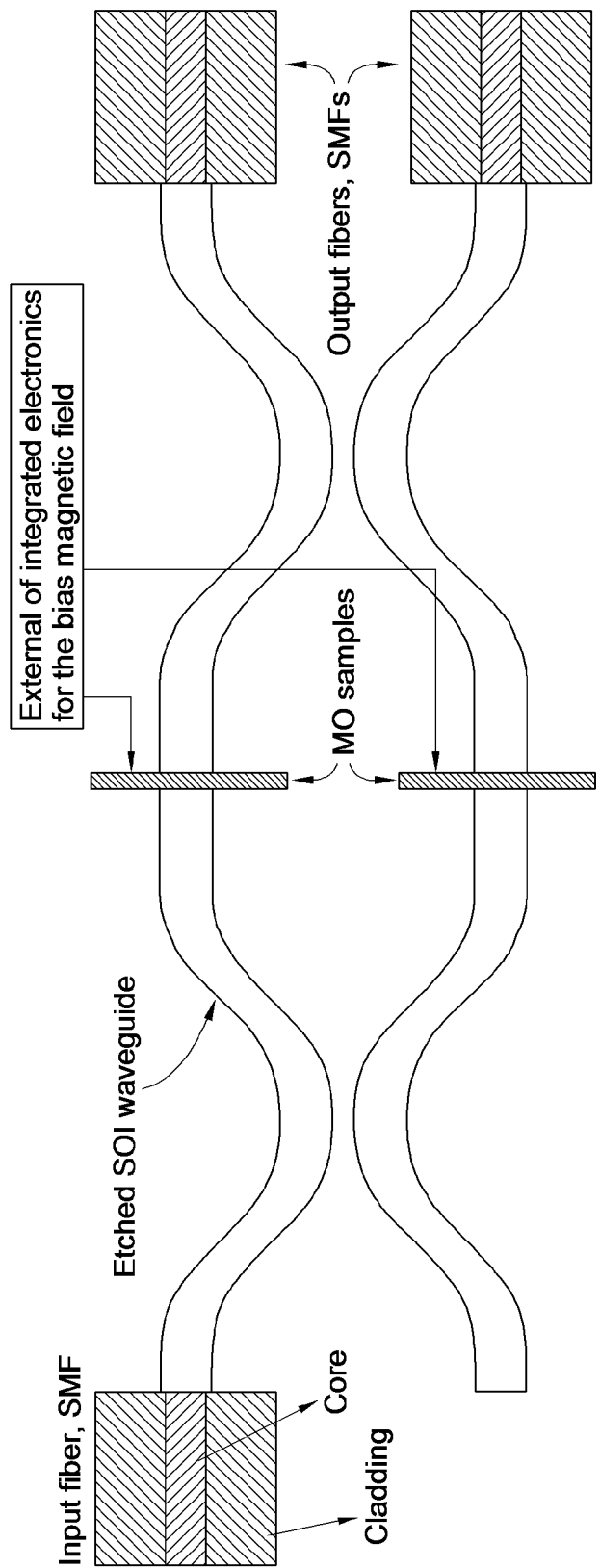
FIG. 12a is a schematic of the top view of an integrated switch on silicon-on-insulator (SOI) wafer.
Figure 12B:
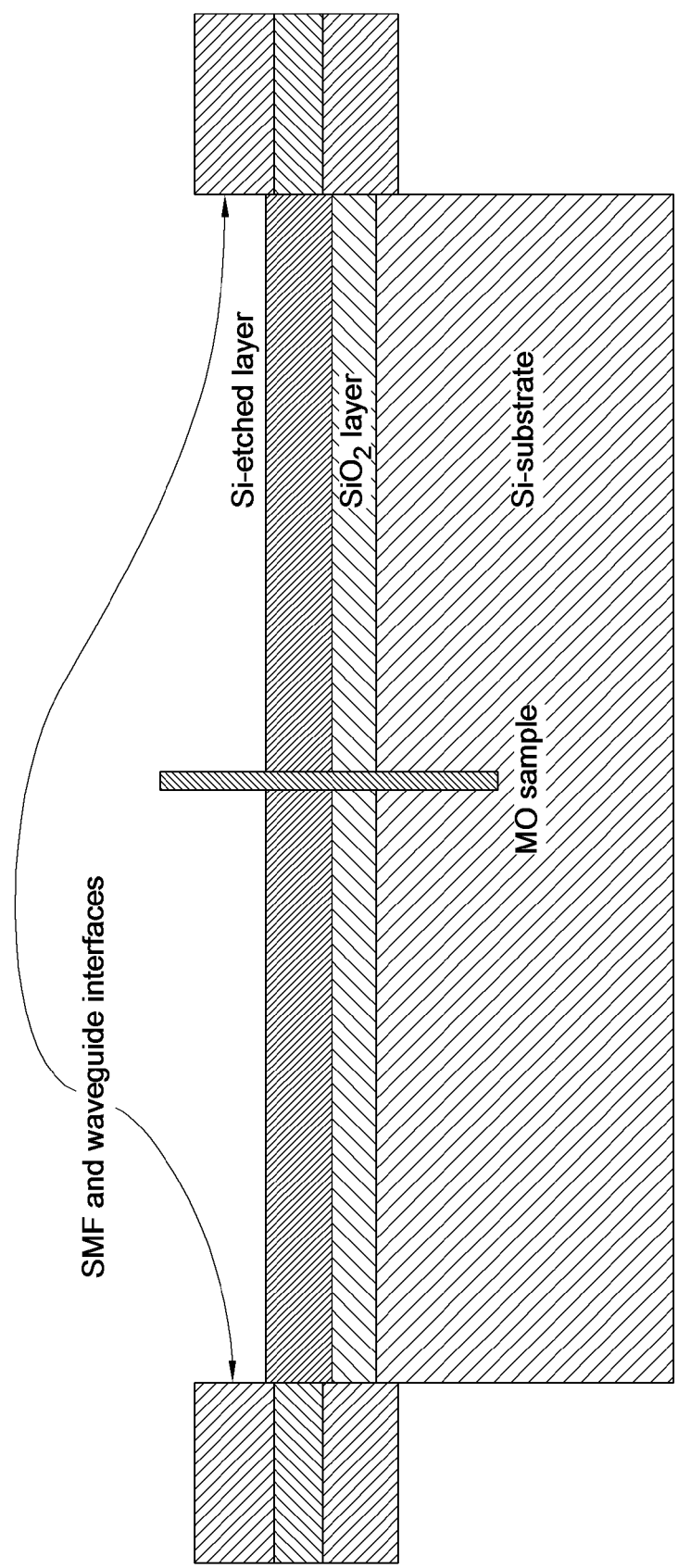
FIG. 12b is a schematic of the side view of the integrated switch.

The top view of an embodiment of an integrated Mach-Zehnder interferometric switch schematic is shown in FIG. 12a. The wafer is silicon-on-insulator of which the top Si layer is etched to fabricate the interferometeric structure. The grooves for the magneto-optic Faraday rotators are made by Deep-Reactive Ion Etching. An external magnetic field is applied to the Faraday rotators to change the state of polarization of the optical signal incident on them. This scheme also includes the fiber-waveguide interfaces as shown in FIG. 12b.

Figure 13:
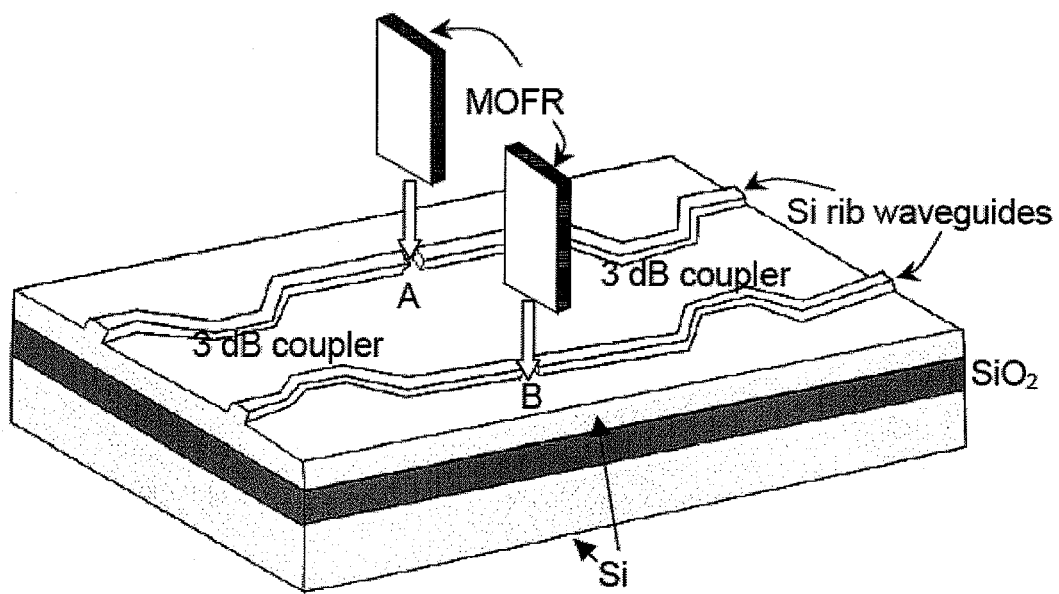
Figure 14:
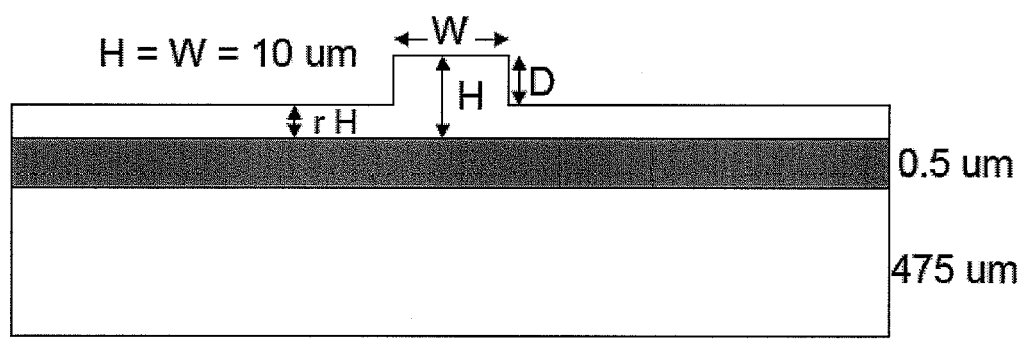
FIG. 14 is a cross sectional illustration of the integrated switch of FIG. 13 including physical dimensional parameter relationships for an embodiment of the invention.

As may best be seen from the illustration of a fabricated device in FIG. 13, the input and output couplers are 3 dB single mode couplers fabricated by etching the top Si layer as mentioned above. As illustrated in FIG. 14, the single mode waveguide dimensions are calculated and a mode matching technique is used to derive the following relationship:

$$\frac{W}{H} = \alpha + \frac{r}{\sqrt{1-r^2}}$$

where $\alpha=0.3$ and $0.5<r<1.0$. The restriction on r eliminate the propagation of higher order modes and the value of $\alpha$ limits W such that higher order horizontal modes are prohibited.

In one embodiment, the value $\alpha=0$ and the values of $H=W=10$ µm in order to be compatible with the single mode fibers with core diameters of 10 µM as discussed above. In such an embodiment, the waveguide dimensions are calculated in accordance with the following relationship:

$$\frac{W}{H} \leq \frac{r}{\sqrt{1-r^2}}$$

Figure 15:
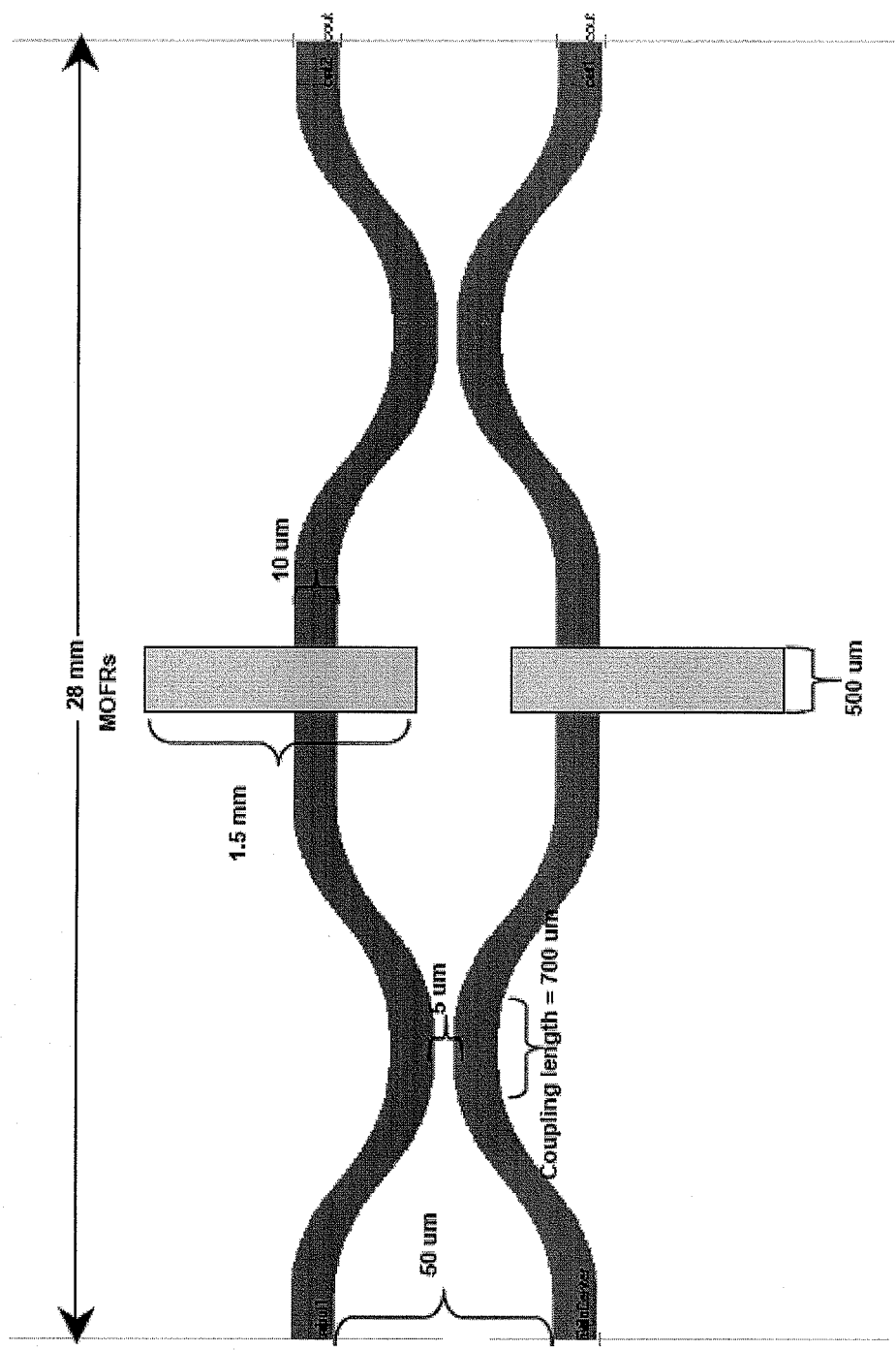
FIG. 15 is a top view illustration of an embodiment of the integrated switch constructed in accordance with the teachings of the present invention showing dimensions and layout for a Faraday rotation based MZI.

In such an embodiment, the value of $r \geq 0.707$ in the illustrated embodiment. If the value of r is set to 0.71, the depth of etch is therefore calculated to be $D=2.9$ µm. Through simulation, the dimensions and layout of an embodiment of a Faraday rotation based MZI were determined as illustrated in FIG. 15.

With the reduction in the size of the device, the external switching circuit for the bias field can be made faster. Further increases in switching speeds can be made with faster switching electronics for the bias field. The location of the beam spot on the surface of the magnetic material is important in order to achieve rotation of polarization of the optical signal by the desired amount. The switch can be designed in an interferometric as well as non interferometric configuration. More complex versions of switches and attenuators can be made from different combinations of these devices.

All references, including publications, patent applications, and patents cited herein are hereby incorporated by reference to the same extent as if each reference were individually and specifically indicated to be incorporated by reference and were set forth in its entirety herein.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. An integrated all-fiber magneto-optic switch having an input and an output, the integrated all-fiber magneto-optic switch comprising:
    a polarization beam splitter for splitting at least one incoming signal into orthogonal polarized paths;
    a silicon-on-insulator (SOI) wafer having a pair of Si rib waveguides defining the orthogonal polarized paths etched thereon;
    at least a first magneto-optic Faraday rotator inserted in a first Si rib waveguide of the pair of Si rib waveguides;
    at least a second magneto-optic Faraday rotator inserted in a second Si rib waveguide of the pair of Si rib waveguides;
    means to produce a field to control the polarization of each of the at least first magneto-optic Faraday rotator in the first Si rib waveguide, whereby presence of the field changes the state of the all-fiber magneto-optic switch; and
    no means to produce a field to control the polarization of each of the at least second magneto-optic Faraday rotator in the second Si rib waveguide.

2. The integrated all-fiber magneto-optic switch of claim 1 wherein the presence of the field changes the state to an off state.

3. The integrated all-fiber magneto-optic switch of claim 1 wherein the reversal of the field changes the state to an on state.

4. The integrated all-fiber magneto-optic switch of claim 1 wherein the presence of the field changes the state to an on state.

5. The integrated all-fiber magneto-optic switch of claim 1 wherein the reversal of the field changes the state to an off state.

6. The integrated all-fiber magneto-optic switch of claim 1 wherein the each of the first and the second magneto-optic Faraday rotator comprises bismuth substituted iron garnet.

7. The integrated all-fiber magneto-optic switch of claim 1 wherein the means to produce the field comprises a current carrying coil wound about each of the at least first magneto-optic Faraday rotator in the first Si rib waveguide.

8. The integrated all-fiber magneto-optic switch of claim 1 wherein at least one of the magneto-optic Faraday rotators has at least one surface defect.

9. The integrated all-fiber magneto-optic switch of claim 1 wherein light does not exit from the all-fiber magneto-optic switch when at least one of the first magneto-optic Faraday rotators is energized.

10. The integrated all-fiber magneto-optic switch of claim 1 further comprising an isolator in each path.

11. The integrated all-fiber magneto-optic switch of claim 1 wherein each of the pair of Si rib waveguides have equal lengths.

12. A silicon-on-insulator integrated Mach-Zehnder interferometric switch comprising:
a silicon-on-insulator wafer having etched on a surface thereof a pair of Si rib waveguides configured to form a first 3 dB waveguide coupler at an input, a second 3 dB integrated waveguide coupler at an output;
a first magneto-optic Faraday rotator interposed in a first Si rib waveguide of the pair of Si rib waveguides;
a second magneto-optic Faraday rotator interposed in a second Si rib waveguide of the pair of Si rib waveguides;
a first coil positioned in proximity to the first magneto-optic Faraday rotator such that energization of the first coil generates a bias magnetic field parallel to a direction of propagation of a light beam in the first Si rib waveguide that changes a polarization of the first magneto-optic Faraday rotator to change a state of the switch; and
wherein there is no coil positioned in proximity to the second magneto-optic Faraday rotator, and wherein the state of the switch is controlled by the first coil.

13. The silicon-on-insulator integrated Mach-Zehnder interferometric switch of claim 12 wherein dimensions of each of the pair of Si rib $$\frac{W}{H} = \alpha + \frac{r}{\sqrt{1-r^2}}$$

waveguides have physical dimensions defined by
where W is a width of the rib waveguide, H is the height of the rib waveguide measured from an insulating layer of the silicon-on-insulator wafer, $\alpha=0.3$, and $0.5 \leq r < 1.0$.

14. The silicon-on-insulator integrated Mach-Zehnder interferometric switch of claim 12, wherein dimensions of each of the first Si rib waveguide and the second Si rib waveguide of the pair of Si rib waveguides have physical dimensions defined by $$\frac{W}{H} \leq \frac{r}{\sqrt{1-r^2}}$$

where W is a width of the rib waveguide, H is the height of the rib waveguide measured from an insulating layer of the silicon-on-insulator wafer, and r is a scaling factor relating H and the depth of etch, D, such that H=D+rH.

15. The silicon-on-insulator integrated Mach-Zehnder interferometric switch of claim 14, wherein H=W and wherein $r \geq \sqrt{0.5}$.

16. The silicon-on-insulator integrated Mach-Zehnder interferometric switch of claim 15, wherein r=0.71, H=W=10 μm, and D=2.9 μm.

17. The silicon-on-insulator integrated Mach-Zehnder interferometric switch of claim 12 wherein at least the first magneto-optic Faraday rotator has at least one surface defect.

18. The silicon-on-insulator integrated Mach-Zehnder interferometric switch of claim 12, wherein the rib waveguides are coupled to single mode fibers having a core diameter of about 10 μm.

19. The silicon-on-insulator integrated Mach-Zehnder interferometric switch of claim 18, wherein the rib waveguides are coupled to the single mode fibers via tapered coupling sections.

20. The silicon-on-insulator integrated Mach-Zehnder interferometric switch of claim 19, wherein the tapered coupling sections are irregular.

21. An integrated all-fiber magneto-optic switch having an input and an output, the integrated all-fiber magneto-optic switch comprising:
a polarization beam splitter for splitting at least one incoming signal into orthogonal polarized paths;
a silicon-on-insulator (SOI) wafer having a pair of Si rib waveguides defining the orthogonal polarized paths etched thereon;
at least a first magneto-optic Faraday rotator inserted in a first Si rib waveguide of the pair of Si rib waveguides;
at least a second magneto-optic Faraday rotator inserted in a second Si rib waveguide of the pair of Si rib waveguides;
a polarization beam coupler to couple the orthogonal polarized paths at the output;
means to produce a field to control the polarization of each of the at least first magneto-optic Faraday rotator in the first Si rib waveguide, whereby presence of the field changes the state of the all-fiber magneto-optic switch;
a third magneto-optic Faraday rotator inserted in the first Si rib waveguide of the pair of Si rib waveguides;
a fourth magneto-optic Faraday rotator inserted in the second Si rib waveguide of the pair of Si rib waveguides; and
wherein the means to produce a field to control the polarization of each of the at least first magneto-optic Faraday rotator in the first Si rib waveguide also controls the polarization of the third magneto-optic Faraday rotator in the first Si rib waveguide.

22. A silicon-on-insulator integrated Mach-Zehnder interferometric switch comprising:
a silicon-on-insulator wafer having etched on a surface thereof a pair of Si rib waveguides configured to form a first 3 dB waveguide coupler at an input, a second 3 dB integrated waveguide coupler at output;
a first magneto-optic Faraday rotator interposed in a first Si rib waveguide of the pair of Si rib waveguides;
a second magneto-optic Faraday rotator interposed in a second Si rib waveguide of the pair of Si rib waveguides;
a first coil positioned in proximity to the first magneto-optic Faraday rotator such that energization of the first coil generates a bias magnetic field parallel to a direction of propagation of a light beam in the first Si rib waveguide that changes a polarization of the first magneto-optic Faraday rotator to change a state of the switch; and a second coil positioned in proximity to the second magneto-optic Faraday rotator such that energization of the second coil generates a reverse-bias magnetic field antiparallel to a direction of propagation of a light beam in the second Si rib waveguide that changes a polarization of the second magneto-optic Faraday rotator.

* * * * *

UNITED STATES PATENT AND TRADEMARK OFFICE
CERTIFICATE OF CORRECTION

Page 1 of 1

PATENT NO. : 7,916,982 B1
APPLICATION NO. : 12/112266
DATED : March 29, 2011
INVENTOR(S) : Rashmi Bahuguna et al.

It is certified that error appears in the above-identified patent and that said Letters Patent is hereby corrected as shown below:

Col. 12,
In claim 1, after line 47, insert as a new sub-paragraph --a polarization beam coupler to couple the orthogonal polarized paths at the output;--

Signed and Sealed this
Twenty-fourth Day of May, 2011

David J. Kappos
*Director of the United States Patent and Trademark Office*